(No Model.)  
2 Sheets—Sheet 1.

J. B. ADT.
TOBACCO CUTTER.

No. 400,723.  Patented Apr. 2, 1889.

WITNESSES  
Dan'l Fisher  
Geo. E. Taylor

INVENTOR  
John B. Adt,  
by Wm. T. Howard,  
atty.

(No Model.)　　　　　　　　　　　　　　　　　2 Sheets—Sheet 2.
J. B. ADT.
TOBACCO CUTTER.

No. 400,723.　　　　　　　　　　　　　Patented Apr. 2, 1889.

WITNESSES
Dan'l Fisher
Geo. E. Taylor

INVENTOR
John B. Adt,
by Geo. W. T. Howard,
Attys.

UNITED STATES PATENT OFFICE.

JOHN B. ADT, OF BALTIMORE, MARYLAND.

TOBACCO-CUTTER.

SPECIFICATION forming part of Letters Patent No. 400,723, dated April 2, 1889.

Application filed October 4, 1888. Serial No. 287,210. (No model.)

*To all whom it may concern:*

Be it known that I, JOHN B. ADT, of the city of Baltimore and State of Maryland, have invented certain Improvements in Tobacco-5 Cutters, of which the following is a specification.

This invention relates to certain improvements in the invention described in Letters Patent No. 233,829, granted to me on the 2d day of November, 1880, for certain improvements in a tobacco-cutter, to which reference should be had; and it consists in the invention more particularly set forth in the claim.

In the further description of the said invention which follows, reference is made to the accompanying drawings, forming a part hereof, and in which—

Figure 1:
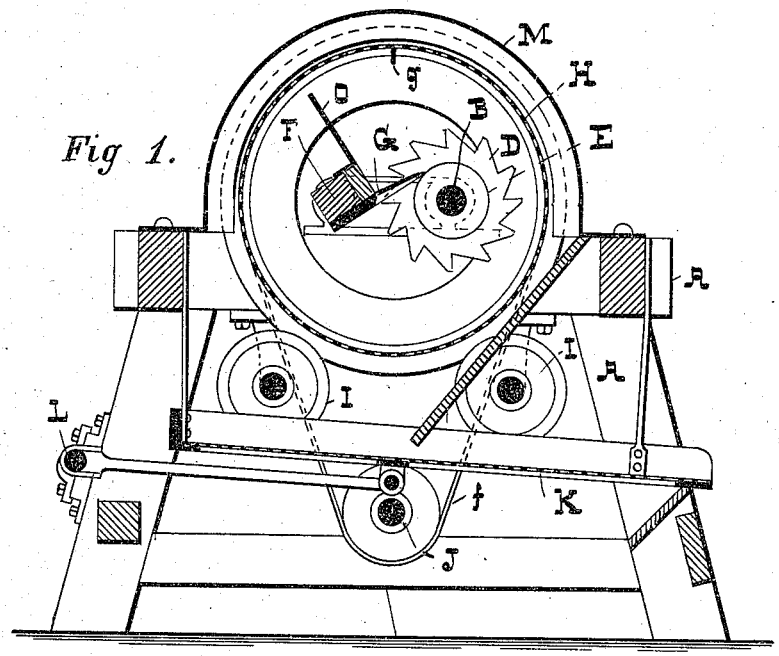
Figure 2:
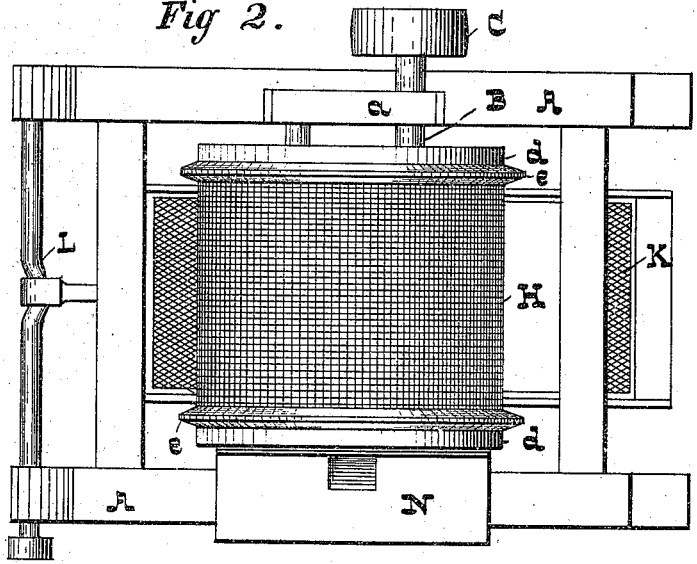
Figure 3:
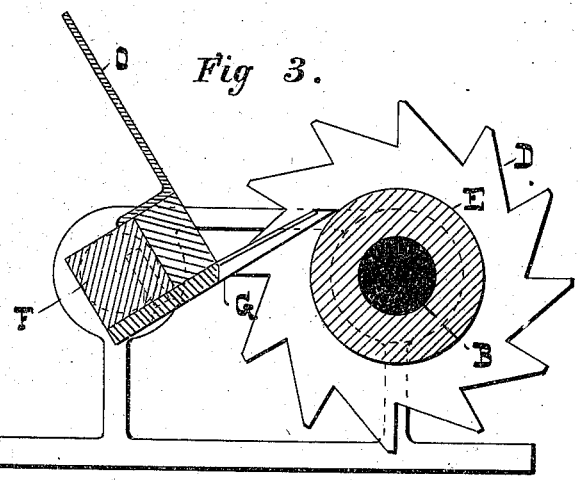
Figure 4:
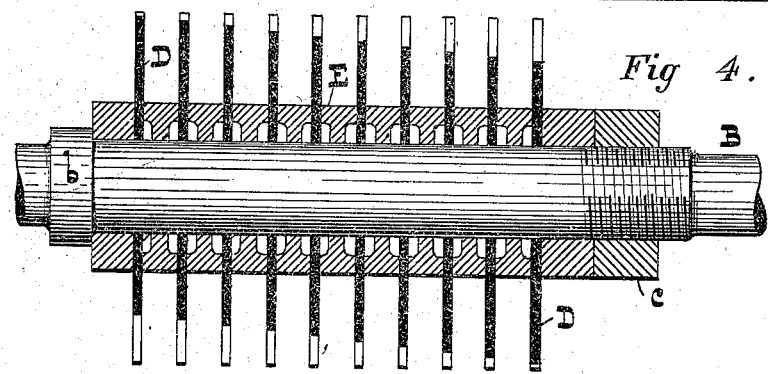
Figure 5:
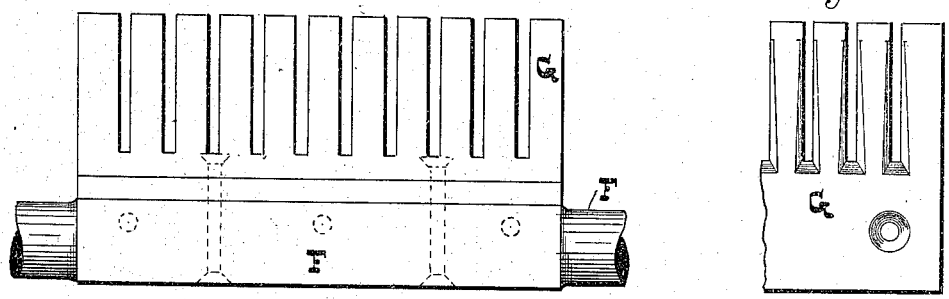

Figure 1 is a transverse section of the improved tobacco-cutter, and Fig. 2 a top view of the same with the upper part of the outer casing removed. Fig. 3 is an enlarged sectional view of the cutting device. Fig. 4 is a view showing one part of the cutting device in section and the other in elevation, and the said two parts separated. Fig. 5 is an under side view of one member of the cutting device.

Similar letters of reference indicate similar parts in all the views.

Referring to the said drawings, A is the frame of the machine.

B is a shaft extending transversely of the frame A and resting in suitable bearing-boxes, one of which is shown and denoted by $a$. On one end of this shaft is secured a driving-pulley, C, which receives its movement from a belt. (Not shown.)

D D are toothed disks or saws on the shaft B, between a collar, $b$, and a nut, $c$.

E E are spacing-washers inserted between the saws to retain them a proper distance apart. The washers between the saws are of greater thickness at the periphery, where they come in contact with the saws, than at the center, where they are connected to the shaft, in order that they may readily adjust themselves to the surfaces of the said saws. By referring to Fig. 4 it will be seen that the saws are set on the shaft so that the teeth are not on a line parallel with the shaft, the teeth thereby forming a spiral around the shaft.

F is a bar fastened transversely of the frame A and on the same horizontal plane as the shaft B.

G is a comb bolted to the bar F, with its teeth extending between the saws D. The general direction of the teeth of the comb, as seen in Figs. 1 and 3, is not toward the center of the shaft carrying the saws, but toward the periphery of the spacing-washers. By this arrangement the cutting-edges of the teeth of the saws do not pass the upper and cutting side of the comb throughout their entire length at once, but meet the root of the teeth first, and the cut is therefore of the nature of a shearing cut. The ends of the comb-teeth also serve as scrapers to keep the spacing-washers clean and free from an accumulation of tobacco. The spaces between the teeth of the comb at its upper surface correspond in width with the thickness of the saws; but in order that the edges of the said teeth may have an angle less than a right angle the said spaces are wider at the base or bottom of the said comb. (See particularly Fig. 5, which is a view of the under side of the comb.)

H is a cylindrical sieve consisting of a piece of wire-cloth attached at its ends to flanges $d$, which are adapted as pulleys to receive the belts by means of which the sieve is revolved. The sieve H rests upon four wheels or rollers, I, and to prevent displacement of the sieve the flanges $d$ are provided with annular projections, $e$, which fit in grooves in the edges of the rollers. A shaft, J, situated below the sieve, driven by a belt from the shaft B, is used to communicate movement to the sieve through the medium of belts $f$, as shown.

K is a shaker or tray, consisting of a skeleton frame, over which is stretched wire-cloth of a finer mesh than the sieve-wire, which receives its motion from a crank-shaft, L, driven in any suitable manner. This tray is merely to remove dust from the smoking-tobacco as delivered from the revoluble sieve. The upper part of the sieve is covered by a casing, M, as shown in Fig. 1. This casing is removed in Fig. 2.

Parts of the machine not yet alluded to will be described in the description of the invention which follows: The machine being placed in operation by means of the driving-pulley, the tobacco to be cut is introduced to the interior of the sieve through a hopper, N. As the sieve revolves, the tobacco contained therein is elevated, so as to fall on the cutter, which reduces a portion of it to the required size. To enforce the elevation of the tobacco in the rotation of the sieve, inwardly-projecting flanges are used, one of which is shown in the drawings, Fig. 1, and denoted by g. In the continued operation of the machine the tobacco which is reduced to the required size by the action of the cutter is discharged through the sieve, while the larger pieces are elevated to the saws and recut.

In order to increase the effectiveness of the flange g as means for returning tobacco to the cutter, I furnish the bar F with a plate, O, which falls back at an angle, and thereby catches much of the tobacco which would otherwise drop beyond the comb, and conducts it to the cutter, where it is recut.

I claim as my invention—

In a machine for cutting tobacco, a series of revoluble saws, combined with a fixed comb placed at an angle with reference to a line drawn from the center of the said saws through the base or support for the said comb, a deflecting device which consists of a plate which extends from the upper surface of the said comb and falls back at an angle from the vertical, and an inclosing revoluble cylindrical sieve, substantially as and for the purpose specified.

JOHN B. ADT.

Witnesses:
DANL. FISHER,
WM. T. HOWARD.